US011000906B2

(12) United States Patent
Kitagawa et al.

(10) Patent No.: US 11,000,906 B2
(45) Date of Patent: May 11, 2021

(54) ENDMILL BODY AND RADIUS END MILL

(71) Applicant: NGK SPARK PLUG CO., LTD., Nagoya (JP)

(72) Inventors: Shusuke Kitagawa, Kani (JP); Yuki Hatano, Kasugai (JP)

(73) Assignee: NGK SPARK PLUG CO., LTD., Nagoya (JP)

(*) Notice: Subject to any disclaimer, the term of this patent is extended or adjusted under 35 U.S.C. 154(b) by 218 days.

(21) Appl. No.: 16/312,447

(22) PCT Filed: Jun. 29, 2017

(86) PCT No.: PCT/JP2017/024039
§ 371 (c)(1),
(2) Date: Dec. 21, 2018

(87) PCT Pub. No.: WO2018/003948
PCT Pub. Date: Jan. 4, 2018

(65) Prior Publication Data
US 2020/0030895 A1    Jan. 30, 2020

(30) Foreign Application Priority Data

Jun. 30, 2016    (JP) ............................. JP2016-130440

(51) Int. Cl.
*B23C 5/10*      (2006.01)
*B23C 5/16*      (2006.01)

(52) U.S. Cl.
CPC .................. *B23C 5/10* (2013.01); *B23C 5/16* (2013.01); *B23C 2210/0485* (2013.01); *B23C 2210/082* (2013.01); *B23C 2210/084* (2013.01)

(58) Field of Classification Search
CPC ........ B23C 2210/02; B23C 2210/0435; B23C 2210/045; B23C 2210/0485;
(Continued)

(56) References Cited

U.S. PATENT DOCUMENTS 6,846,135 B2 *  1/2005  Kuroda ................... B23C 5/10
                                                        407/34
7,402,004 B2 *  7/2008  Tanaka .................... B23C 5/10
                                                        407/53
(Continued)

FOREIGN PATENT DOCUMENTS

EP    3263255 A1    1/2018
JP    H07-241715 A  9/1995
(Continued)

OTHER PUBLICATIONS

European Patent Office, Extended European Search Report issued in corresponding Application No. EP 17 82 0302, dated Mar. 3, 2020.
(Continued)

*Primary Examiner* — Sara Addisu
(74) *Attorney, Agent, or Firm* — Stites & Harbison, PLLC; Jeffrey A. Haeberlin; Gary N. Stewart (57) ABSTRACT

In an end mill body made of ceramic, a corner R rake face is formed in such a manner as to contain a point B and at least a region B, not a region A located on a side toward an end cutting edge. In other words, a first end portion of a cutting edge on a peripheral edge portion of the corner R rake face is formed on a peripheral edge of the region B of a corner R cutting edge, and a second end portion of the cutting edge reaches at least the point B. As a result, partial breakage of the corner R cutting edge is unlikely to occur in the course of cutting. That is, since the corner R rake face is formed in such a manner as to start from the first end portion located apart from a point A, which is the intersection of the end cutting edge and the corner R cutting edge, and such that the second end portion reaches the point B, a large cutting load is unlikely to be imposed on the starting point of the corner R rake face. Therefore, the corner R cutting edge is unlikely to be chipped.

7 Claims, 9 Drawing Sheets

(58) Field of Classification Search
CPC ........ B23C 2210/082; B23C 2210/084; B23C 2210/54; B23C 2226/18; B23C 2226/73; B23C 2240/32; B23C 5/10; B23C 5/16
See application file for complete search history.

(56) References Cited

U.S. PATENT DOCUMENTS

| | | | |
|---|---|---|---|
| 7,611,311 B2* | 11/2009 | Kakai | B23B 31/1107 279/8 |
| 7,780,379 B2* | 8/2010 | Turrini | B23C 5/10 407/30 |
| 8,556,547 B2* | 10/2013 | Takagi | B23C 5/10 407/54 |
| 9,227,253 B1* | 1/2016 | Swift | B23C 5/00 |
| 9,707,627 B2* | 7/2017 | Yamayose | B23C 5/10 |
| 2005/0025584 A1* | 2/2005 | Kolker | B23C 5/10 407/54 |
| 2005/0186037 A1* | 8/2005 | Svensson | B23C 5/10 407/53 |
| 2011/0268513 A1 | 11/2011 | Takagi et al. | |
| 2014/0341662 A1* | 11/2014 | Yamayose | B23C 5/10 407/54 |
| 2016/0074947 A1* | 3/2016 | Shpigelman | B23C 5/10 407/54 |
| 2018/0036809 A1* | 2/2018 | Maeda | B23C 5/10 |
| 2018/0133811 A1* | 5/2018 | Baskut | B23C 5/10 |
| 2020/0030895 A1* | 1/2020 | Kitagawa | B23C 5/16 |

FOREIGN PATENT DOCUMENTS

| | | |
|---|---|---|
| JP | H10-249627 A | 9/1998 |
| JP | 2006-297495 A | 11/2006 |
| JP | 2010-201564 A | 9/2010 |
| JP | 2014-097574 A | 5/2014 |
| JP | 5731102 B2 | 6/2015 |

OTHER PUBLICATIONS

Japan Patent Office, International Search Report issued in corresponding Application No. PCT/JP2017/024039, dated Sep. 12, 2017.

* cited by examiner

ENDMILL BODY AND RADIUS END MILL

CROSS-REFERENCE TO RELATED APPLICATION

The present international application claims priority to Japanese Patent Application No. 2016-130440 filed on Jun. 30, 2016 at the Japanese Patent Office and incorporates herein Japanese Patent Application No. 2016-130440 in its entirety.

TECHNICAL FIELD

The present disclosure relates to an end mill body having corner R cutting edges arcuately projecting at the periphery of a distal end portion thereof, and to a radius end mill.

BACKGROUND ART

Conventionally, there is known a radius end mill made of cemented carbide and having corner R cutting edges each arcuately projecting outward between an end cutting edge and a peripheral cutting edge. In recent years, a radius end mill made of ceramic; for example, silicon nitride or the like, has been developed.

In cutting, for example, a heat-resisting alloy such as INCONEL (registered trademark) by use of such a radius end mill made of ceramic, in some cases a partial breakage or like damage has occurred on a corner R cutting edge, since a large cutting load acts on an end cutting edge and a portion of the corner R cutting edge near the end cutting edge (particularly on the intersection of the end cutting edge and the corner R cutting edge).

In order to cope with such a problem, Patent Document 1 proposes a technique in which a corner R rake face (corner R gash) is provided, and the starting point of the corner R rake face is provided on the end cutting edge, whereby partial breakage of the corner R cutting edge is prevented.

PRIOR ART DOCUMENT

Patent Document

Patent Document 1: Japanese Patent No. 5731102

SUMMARY OF THE INVENTION

Problem to be Solved by the Invention

However, in spite of use of the above-mentioned technique, in some cases, chipping initiates from the starting point of the corner R rake face provided on the end cutting edge, since a large cutting load is imposed on the end cutting edge in the course of cutting; therefore, further improvement has been desired.

In one aspect of the present disclosure, it is desired to provide an end mill body and a radius end mill in which a chipping or like damage is unlikely to occur on corner R cutting edges, etc., in the course of cutting.

Means for Solving the Problem (1) One aspect of the present disclosure relates to an end mill body made of ceramic and constituting a distal-end side of a radius end mill to be rotated about an axial line.

The end mill body has a chip ejection groove formed in a periphery of a distal end portion of the end mill body in such a manner as to extend from a distal-end side toward a rear-end side while twisting in a direction opposite a direction of rotation, a peripheral cutting edge formed on a peripheral-side ridge of the chip ejection groove, a gash extending from a distal end portion of the end mill body to the chip ejection groove, an end cutting edge rake face formed on the gash, an end cutting edge formed on a distal end portion of the end mill body, a corner R cutting edge extending from the end cutting edge to the peripheral cutting edge in such an arcuate manner as to be outwardly convex, and a corner R rake face provided between the end cutting edge rake face and the chip ejection groove in such a manner as to adjoin the corner R cutting edge.

Further, with a point A representing an intersection of the corner R cutting edge and the end cutting edge and with a point B representing an intersection of the corner R cutting edge and the peripheral cutting edge, as viewed from a direction perpendicular to a plane which contains the axial line and passes through the point B, a point C represents an intersection of a straight line A in parallel with the axial line and passing through the point A and a straight line B perpendicular to the axial line and passing through the point B. Further, when a region surrounded by the straight line A, the straight line B, and the corner R cutting edge is divided by a straight line C passing through the point C and through a midpoint of a straight line extending from the point A to the point B, a region A represents a region located on a side toward the point A with respect to the dividing straight line C, and a region B represents a region located on a side toward the point B with respect to the dividing straight line C. In this case, the corner R rake face does not exist in the region A, contains the point B, and is formed in at least the region B.

As mentioned above, in the present end mill body, the corner R rake face (i.e., a corner R gash) is not formed in the region A located on the end-cutting-edge side, but contains the point B and is formed in at least the region B. In other words, a cutting edge on a peripheral edge portion (i.e., a peripheral end) of the corner R rake face is a portion of the corner R cutting edge extending from the point A to the point B and is formed on the peripheral edge of the region B, not the region A, and the peripheral-cutting-edge side end of the cutting edge reaches the point B or extends beyond the point B into a portion of the peripheral cutting edge. Therefore, the present end mill body has an advantageous effect: that is, the corner R cutting edge is unlikely to be chipped in the course of cutting.

That is, the cutting edge on the peripheral end of the corner R rake face has a first end portion (a starting point) on the end-cutting-edge side and a second end portion (an end point) on the peripheral-cutting-edge side. The first end portion is located apart from the point A, which is the intersection of the end cutting edge and the corner R cutting edge, and the second end portion is located at the point B or on the peripheral-cutting-edge side with respect to the point B. Therefore, in the course of cutting, a large cutting load is unlikely to be imposed on the first end portion of the peripheral end of the corner R rake face. Accordingly, the present end mill body has an advantage: that is, the corner R cutting edge is unlikely to be chipped.

The expression "the corner R rake face does not exist in the region A, contains the point B, and is formed in at least the region B" means that, as mentioned above, the range of formation of the corner R rake face exists in the region B (not the region A) and that the second end portion of the peripheral end of the corner R rake face is located at the point B or on the peripheral-cutting-edge side with respect to the point B.

The corner R rake face may be formed so as to be smoothly connected to the peripheral cutting edge. In the present end mill body, as mentioned above, the corner R rake face is formed between the end cutting edge rake face and the chip ejection groove (so-called a chip space) in such a manner as to reach the corner R cutting edge. Therefore, the end cutting edge rake face is present in a region corresponding to the end cutting edge, and reaches the region A and, furthermore, an end-cutting-edge-side end portion of the corner R rake face in the region B.

(2) In the above-mentioned end mill body, an end rake formed by the end cutting edge may be −5° to −10°, and an axial rake formed by the end cutting edge rake face may be positive.

The inventors of the present invention, et al., have found from our studies that, in cutting, for example, a heat resistant alloy by use of a radius end mill made of ceramic, if the axial rake is negative, adhesion of workpiece material is apt to occur on an end-cutting-edge-side cutting edge. The occurrence of adhesion of workpiece material may lead to the occurrence of partial breakage of the cutting edge as a result of the occurrence of chipping of the cutting edge stemming from dropping out of a portion to which the workpiece material has adhered.

By contrast, in the present end mill body, since the axial rake formed by the end cutting edge rake face is positive (+), the occurrence of adhesion of workpiece material can be restrained; as a result, the occurrence of partial breakage of the cutting edges such as the end cutting edge and the corner R cutting edge can be restrained. Also, through employment of a positive axial rake formed by the end cutting edge rake face, chip ejectability is improved; a bite of a chip can be restrained; and the occurrence of partial breakage of the cutting edges such as the end cutting edge and the corner R cutting edge can be restrained.

Further, in the case of an end mill body made of ceramic, through employment of a positive axial rake formed by the end cutting edge rake face, the occurrence of adhesion of workpiece material can be restrained, but the tips of the cutting edges tend to be chipped as compared with the case of an end mill body made of cemented carbide, for example; by contrast, in the case of the present end mill body, since an end rake formed by the end cutting edge is negative; specifically, −5° to −10°, the occurrence of partial breakage of the tips of the cutting edges can be restrained.

That is, the present end mill body yields marked effects of restraining the occurrence of adhesion of workpiece material and comprehensively restraining the occurrence of partial breakage of the cutting edges.

Figure 5:
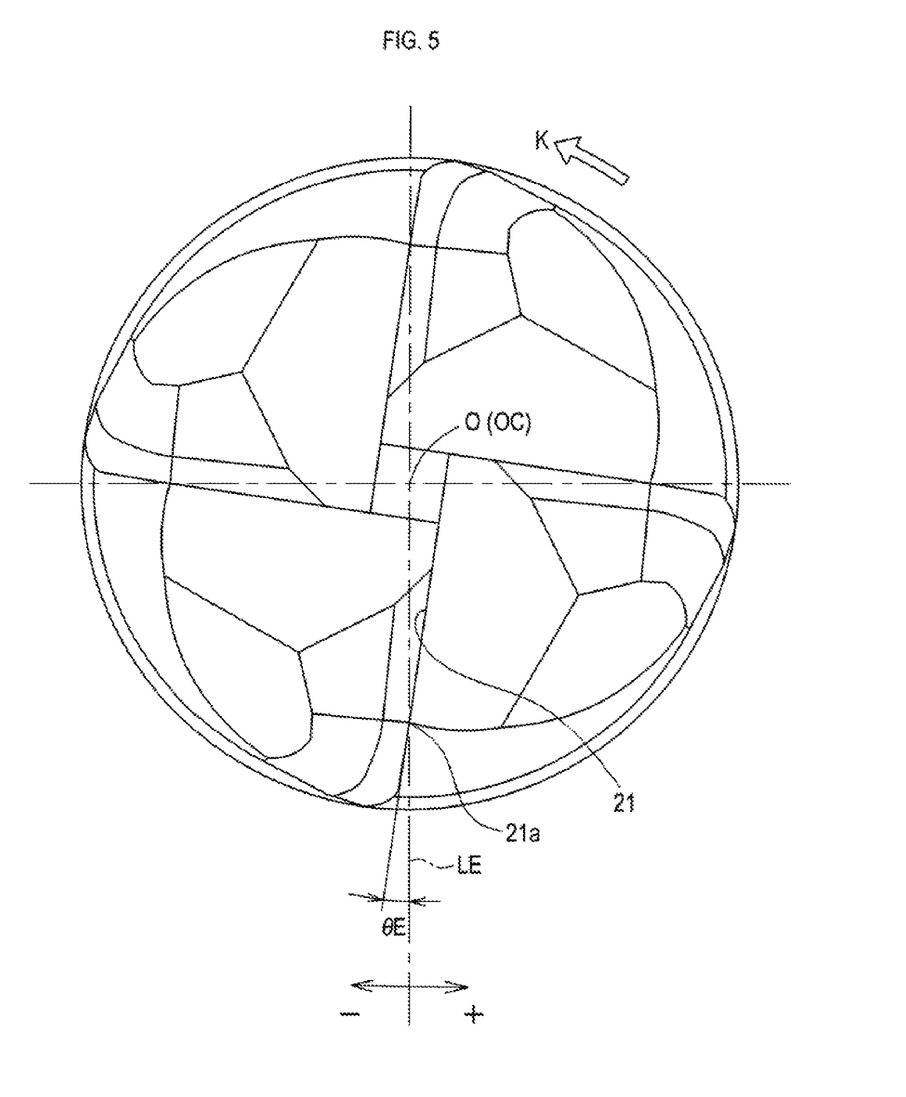
FIG. 5 Bottom view showing, on an enlarged scale, the distal-end side of the radius end mill of the first embodiment as viewed from the axial direction, and showing an end rake.

Notably, the above-mentioned term "end rake" means the following angle: as shown in FIG. 5 which will be mentioned later, as viewed from a distal-end side along the axial line, an angle (θE) between the end cutting edge and a straight line (LE) extending from the center axis to a peripheral end of the end cutting edge. A negative (i.e., minus (−)) end rake formed by the end cutting edge indicates that the end cutting edge is inclined from the straight line (LE) in the direction opposite the direction of rotation (K).

Figure 4:
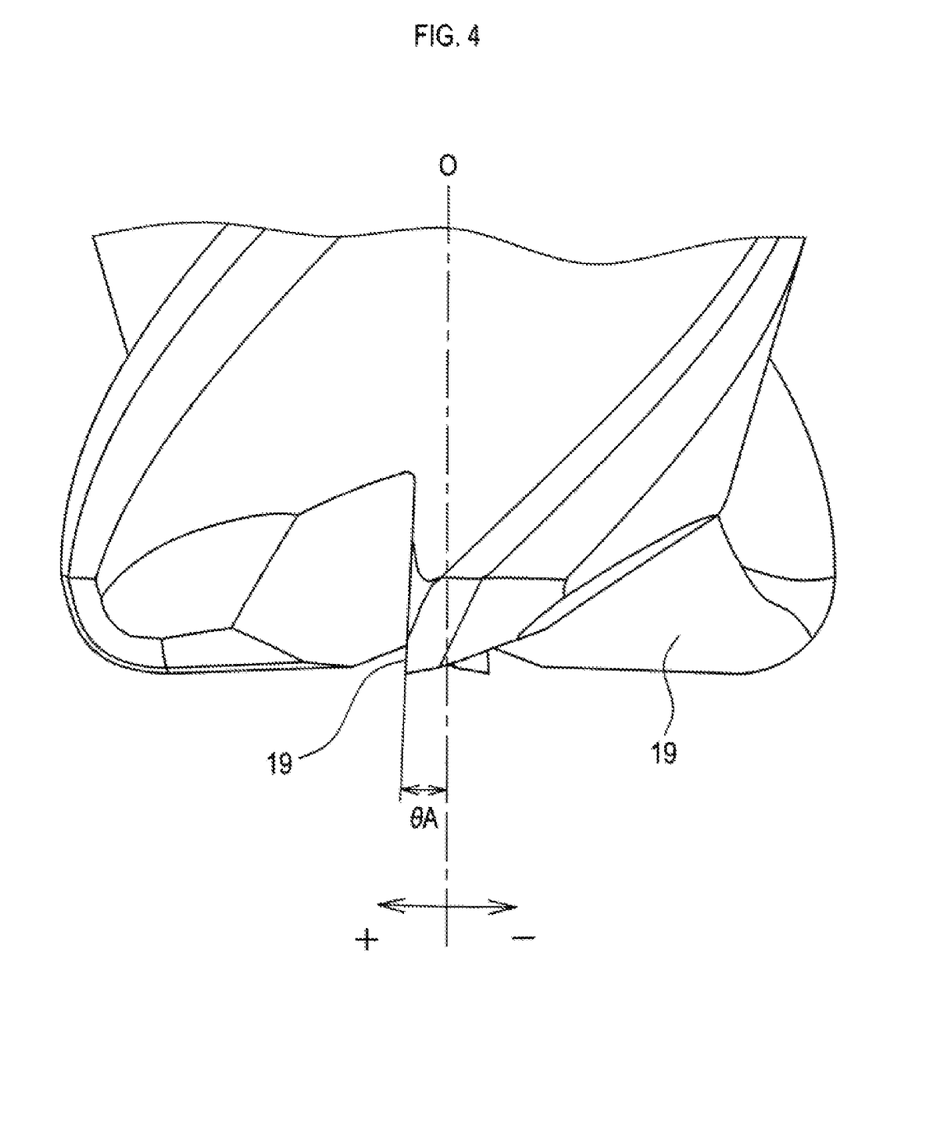
FIG. 4 Side view showing, on an enlarged scale, a portion of the distal-end side of the radius end mill of the first embodiment, and showing an axial rake.

A positive axial rake (θA) formed by the end cutting edge rake face indicates that the end cutting edge rake face is formed as follows: as shown in FIG. 4 which will be mentioned later, the distal-end side (the peripheral end) of the end cutting edge rake face with respect to the axial direction is located ahead of the rear-end side of the end cutting edge rake face in the rotational direction.

(3) In the above-mentioned end mill body, the axial rake formed by the end cutting edge rake face may be +1° to +5°.

The inventors of the present invention, et al., have found from our studies that at an axial rake of +1° to +5° formed by the end cutting edge rake face, chipping is less likely to occur on the end cutting edge and the corner R cutting edge; thus, the axial rake of such a range is preferred.

Notably, at an axial rake of less than +1° formed by the end cutting edge rake face, adhesion of workpiece material is likely to occur, and at an axial rake in excess of +5°, partial breakage of the tips of the cutting edges is likely to occur.

(4) Another aspect of the present disclosure relates to an end mill body made of ceramic and constituting a distal-end side of a radius end mill to be rotated about an axial line.

The end mill body has a chip ejection groove formed in a periphery of a distal end portion of the end mill body in such a manner as to extend from a distal-end side toward a rear-end side while twisting in a direction opposite a direction of rotation, a peripheral cutting edge formed on a peripheral-side ridge of the chip ejection groove, a gash extending from a distal end portion of the end mill body to the chip ejection groove, an end cutting edge rake face formed on the gash, an end cutting edge formed on a distal end portion of the end mill body, and a corner R cutting edge extending from the end cutting edge to the peripheral cutting edge in such an arcuate manner as to be outwardly convex.

Further, in the end mill body, an end rake formed by the end cutting edge is −5° to −10°, and an axial rake formed by the end cutting edge rake face is positive.

The present end mill body yields action and effect similar to those yielded by the end mill body appearing in the aforementioned section (2).

(5) In the above-mentioned end mill body, the axial rake formed by the end cutting edge rake face may be +1° to +5°.

The above-mentioned end mill body yields action and effect similar to those yielded by the end mill body appearing in the aforementioned section (3).

(6) The above-mentioned end mill body may further have a corner R rake face provided between the end cutting edge rake face and the chip ejection groove in such a manner as to adjoin the corner R cutting edge.

As compared with an end mill body not having a corner R rake face provided between the end cutting edge rake face and the chip ejection groove in such a manner as to adjoin the corner R cutting edge, the present end mill body has an advantage that partial breakage of the cutting edges such as the end cutting edge and the corner R cutting edge is unlikely to occur.

(7) The above-mentioned end mill body may comprise a body-side connection portion provided on a rear-end side thereof in such a manner as to be detachably connected to a shank to be fixed to a rotating shaft of a machine tool.

In the present end mill body, by use of the body-side connection portion, the end mill body and the shank can be detachably connected.

Notably, the shank is a rodlike member constituting a rear-end side of a radius end mill, is fixed to the rotating shaft of the machine tool, and rotates with the end mill body as a result of rotation of the rotating shaft.

(8) A radius end mill according to a further aspect of the present disclosure comprises an end mill body provided on a distal-end side thereof for cutting a workpiece, and a shank provided on a rear-end side thereof and to be fixed to a rotating shaft of a machine tool, and the end mill body may be an end mill body according to any one of the above-mentioned sections (1) to (6).

Since the above-mentioned end mill body constitutes the distal-end side of the present radius end mill for performing cutting, the radius end mill yields various effects to be yielded by the above-mentioned end mill body.

(9) The above-mentioned radius end mill is made of ceramic, and the end mill body and the shank may be integrated with each other.

That is, the present radius end mill is a ceramic part configured such that the distal-end side end mill body made of ceramic and a ceramic member (e.g., a shank made of ceramic and to be fixed to a rotating shaft of a machine tool) located rearward of the end mill body are integrated with each other.

Since the present radius end mill is a unitary ceramic part, as compared with a radius end mill having, for example, a shank made of metal, the present radius end mill has the advantage of being very light-weight.

(10) The above-mentioned radius end mill is configured such that the end mill body and the shank are detachably connected to each other, and the end mill body may comprise a body-side connection portion provided on a rear-end side thereof in such a manner as to be detachably connected to the shank.

Therefore, for example, in the event of wear or breakage of the distal-end side of the end mill body as a result of cutting, only the end mill body can be detached from the shank for replacement.

Notably, in the present disclosure, a part made of ceramic refers to a part formed by sintering a green part formed of a material containing ceramic as a main component; i.e., a material containing ceramic in an amount of greater than 50% by volume (preferably, 90% by volume or more).

DESCRIPTION OF REFERENCE NUMERALS 1, 31, 41: radius end mill
3, 43: end mill body
5, 47: shank
9: chip ejection groove
13: peripheral cutting edge
17: gash
19: end cutting edge rake face
21: end cutting edge
23: corner R cutting edge
25: ridge
27: corner R rake face
49: body-side connection portion

MODES FOR CARRYING OUT THE INVENTION

Embodiments of an end mill body and a radius end mill of the present disclosure will next be described.

1. First Embodiment 1-1. Overall Configuration

First, the overall configuration of a radius end mill of the present first embodiment will be described.

Figure 1:
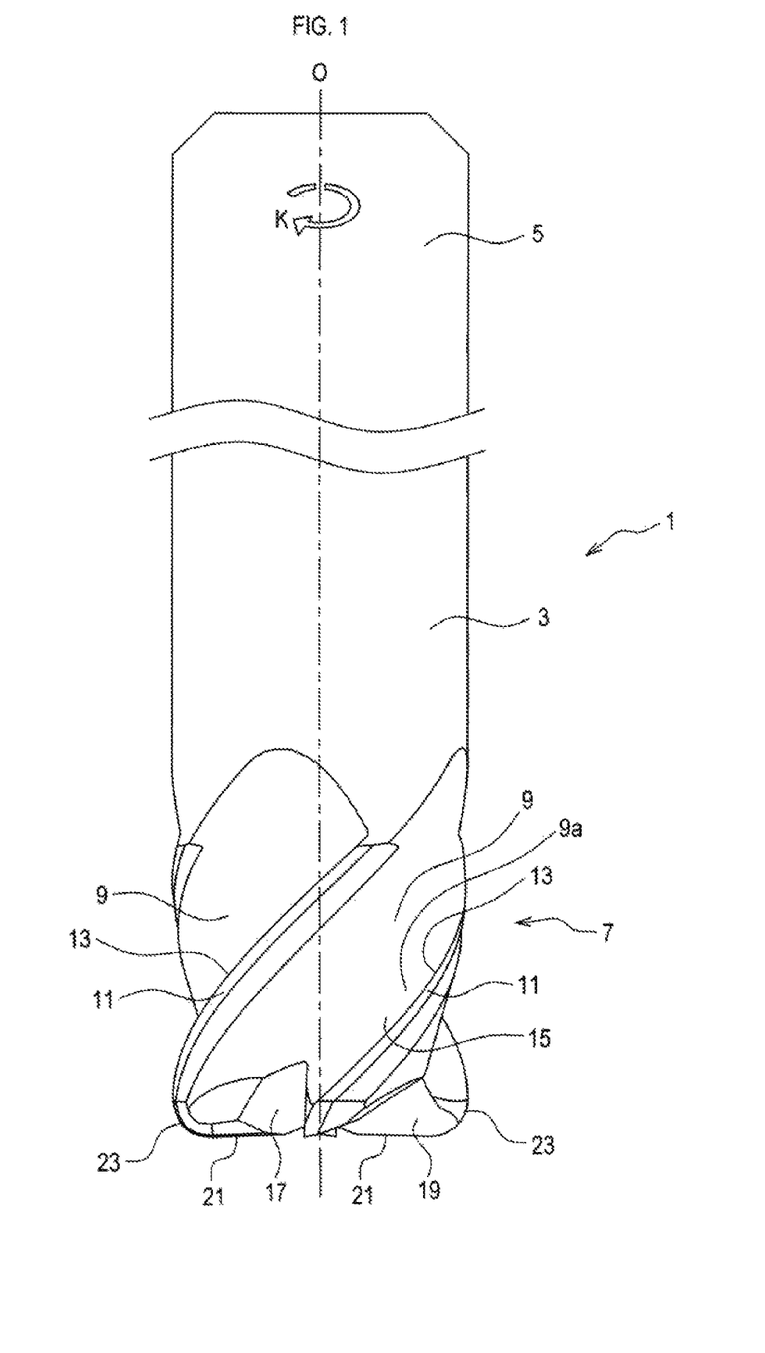
FIG. 1 Side view showing a radius end mill of a first embodiment.

As shown in FIG. 1, a radius end mill 1 of the present first embodiment is a cutting tool having an approximately circular columnar shape and formed by use of, for example, ceramic such as silicon nitride or the like.

In machining by use of the radius end mill 1, while the radius end mill 1 is rotated by a machine tool (not shown) in the direction of rotation (direction K) about an axial line O, the radius end mill 1 is fed in a predetermined direction perpendicular to the axial line O, thereby cutting a workpiece (not shown), or an object to be machined.

The radius end mill 1 has an approximately circular columnar end mill body (i.e., a head portion) 3 having the axial line O as its center line and located on a distal-end side thereof. The radius end mill 1 also has a shank 5 located rearward (upward in FIG. 1) of the end mill body 3 and adapted to be attached to a spindle of the machine tool. The end mill body 3 has a cutting edge portion 7 located on the distal-end side thereof and adapted to cut the workpiece.

The cutting edge portion 7 has, at its periphery, a plurality of (e.g., four) chip ejection grooves (so-called chip spaces: flutes) 9 extending from its distal-end side (the lower side in FIG. 1) toward the rear-end side while twisting in the direction opposite the direction of rotation about the axial line O, and formed at circumferentially equal intervals.

Peripheral cutting edges 13 are provided on respective peripheral-side ridges of walls 9a of the chip ejection grooves 9, which walls face toward the direction of rotation. Specifically, the peripheral cutting edge 13 is provided on a boundary ridge portion between the wall 9a and a peripheral face of the cutting edge portion 7 (i.e., a peripheral flank 11) extending from the wall 9a in the direction opposite the direction of rotation of the wall 9a. Similar to the chip ejection groove 9, the peripheral cutting edge 13 is formed in such a manner as to extend from the distal-end side toward the rear-end side while twisting in a direction opposite the direction of rotation about the axial line O. Notably, a peripheral cutting edge rake face 15 is formed on the wall 9a along the peripheral cutting edge 13.

On a distal end portion of the cutting edge portion 7, a distal-end-side opening portion of each chip ejection groove 9 is scraped toward the axial line O in a groove shape, thereby forming a gash 17. That is, the gash 17 is formed in such a manner as to reach the chip ejection groove 9 from a distal end portion of the end mill body 3.

A wall of the gash 17, which wall faces toward the direction of rotation, serves as an end cutting edge rake face 19, and an end cutting edge 21 is formed on a distal-end-side ridge of the wall in such a manner as to extend radially from the vicinity of the axial line O. That is, the end cutting edges 21 are formed on a distal end portion of the end mill body 3.

Further, a corner R cutting edge 23 is formed from the end cutting edge 21 to the peripheral cutting edge 13 in such an arcuate manner as to be outwardly convex.

1-2. Configurational Features of Cutting Edge Portion

Next, configurational features of the cutting edge portion 7, which is an essential portion of the present first embodiment, will be described.

<Corner R Rake Face>

Figure 2:
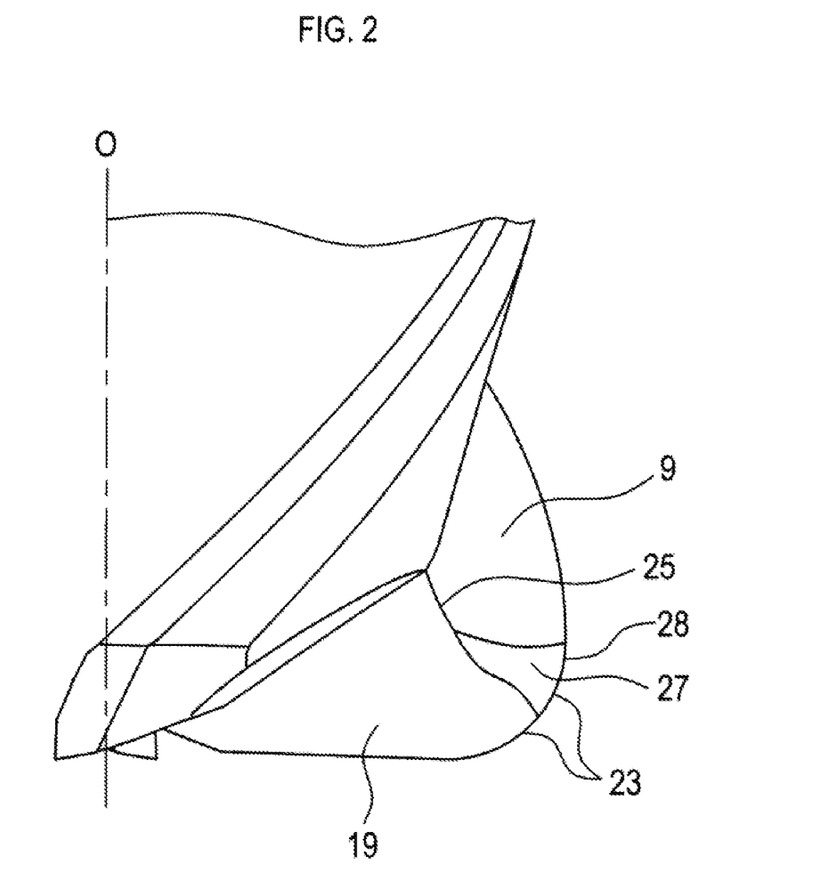
FIG. 2 Side view showing a portion of the distal-end side of the radius end mill of the first embodiment.

As shown on an enlarged scale in FIG. 2, a peripheral-side portion between the end cutting edge rake face 19 and the chip ejection groove 9 is cut away to a point adjacent to the corner R cutting edge 23, thereby providing a corner R rake face (i.e., a corner R gash) 27 as a wall oriented in the direction of rotation.

Notably, in forming the corner R rake face 27, a portion between the end cutting edge rake face 19 and the chip ejection groove 9 (a so-called ridge portion) is removed toward a peripheral end, whereby the corner R rake face 27 can be formed in such a manner as to reach the peripheral end in a smoothly curved form.

Notably, where a ridge portion is not cut away, there is formed a ridge 25 at which an end portion of the end cutting edge rake face 19 and an end portion of the chip ejection groove 9 adjoin each other.

Figure 3:
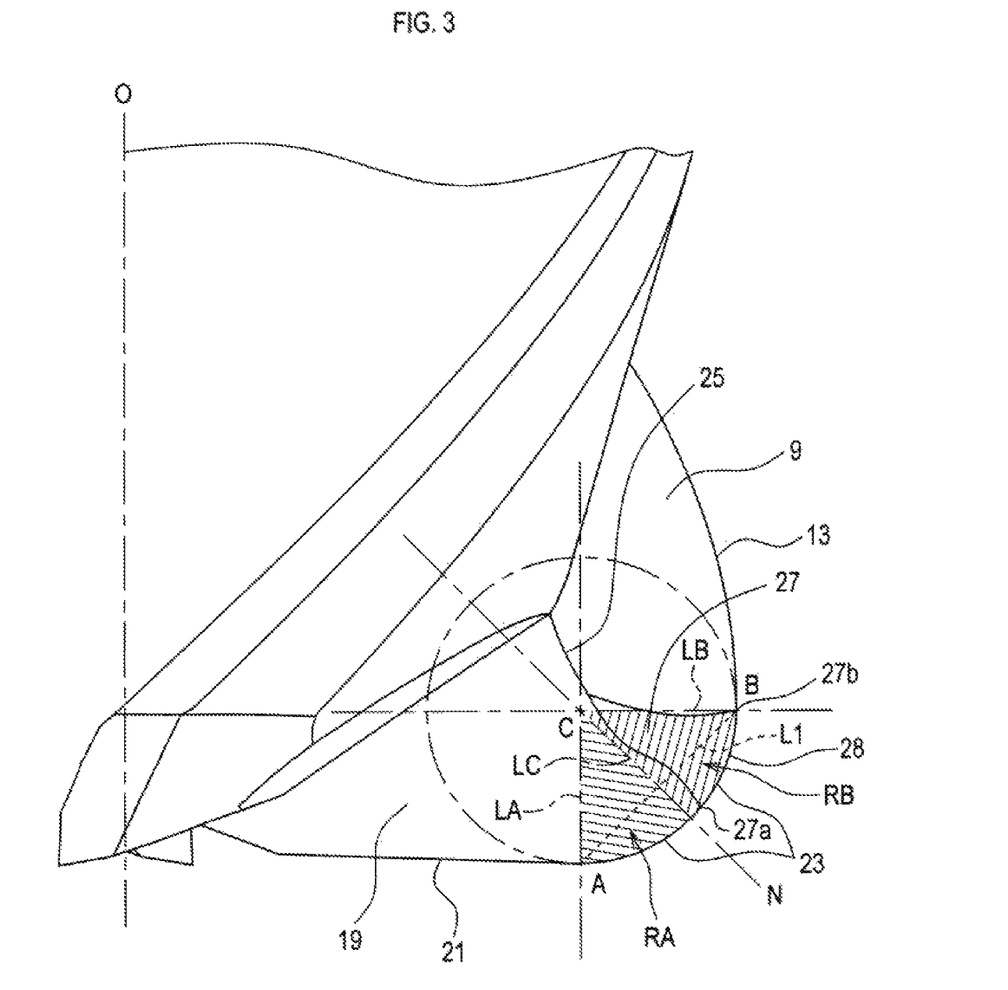
FIG. 3 Side view showing, on an enlarged scale, a portion of the distal-end side of the radius end mill of the first embodiment.

More specifically, as shown in FIG. 3, with a point A representing an intersection of the corner R cutting edge 23 and the end cutting edge 21 and with a point B representing an intersection of the corner R cutting edge 23 and the peripheral cutting edge 13, as viewed from a direction perpendicular to a plane which contains the axial line O and passes through the point B (as viewed from a direction perpendicular to the paper on which FIG. 1 appears), a point C represents an intersection of a straight line A (LA) in parallel with the axial line O and passing through the point A and a straight line B (LB) perpendicular to the axial line O and passing through the point B. Further, when a region surrounded by the straight line A, the straight line B, and the corner R cutting edge 23 is divided by a straight line C (CL) passing through the point C and through a midpoint of a straight line (L1) extending from the point A to the point B, a region A (RA) represents a region located on a side toward the point A with respect to the dividing straight line C, and a region B (RB) represents a region located on a side toward the point B with respect to the dividing straight line C. In this case, the corner R rake face 27 does not exist in the region A, contains the point B, and is formed in at least the region B.

Therefore, a cutting edge 28 on the peripheral end of the corner R rake face 27 is formed in such a manner as to extend from an end-cutting-edge-21-side first end portion 27a of the peripheral end of the corner R rake face 27 located within the region B to a peripheral-cutting-edge-13-side second end portion 27b of the peripheral end. Notably, in the first embodiment, the second end portion 27b coincides with the point B.

Notably, the shape of the corner R cutting edge 23 as viewed in a plane which contains the axial line O and the point B can be, for example, a portion (arc) of a circle having a radius of 1.5 mm; additionally, the shape can be an arcuate shape curved smoothly so as to be outwardly convex.

That is, the corner R rake face 27 is formed as a continuous, smooth single surface so as to not exist in the region A located on the end-cutting-edge-21 side, to contain the point B, and to exist in at least the region B. In other words, a peripheral edge portion (i.e., the cutting edge 28, which is a peripheral end) of the corner R rake face 27 is a portion of the corner R cutting edge 23 formed on the peripheral edge of the region B, not the region A. The peripheral-cutting-edge-13-side second end portion 27b of the cutting edge 28 reaches the point B.

That is, the cutting edge 28 on the peripheral edge of the corner R rake face 27 is formed in such a manner as to start from a position (specifically, the first end portion 27a, which is a position within the region B) located away from the point A, which is the intersection of the end cutting edge 21 and the corner R cutting edge 23, and to end at the point B.

Notably, in the present first embodiment, the corner R rake face 27 is formed in such a manner as to cut away a peripheral-side portion between the end cutting edge rake face 19 and the chip ejection groove 9. Therefore, the end cutting edge rake face 19 reaches the region A and an end-cutting-edge-21-side end portion of the corner R rake face 27.

<Axial Rake>

As shown on an enlarged scale in FIG. 4, in the present first embodiment, an axial rake ($\theta$A) formed by the end cutting edge rake face 19 is positive (+). FIG. 4 shows positive (+) and negative (−) of the axial rake ($\theta$A).

Notably, the axial rake ($\theta$A) is an angle of the axially distal-end side (peripheral end) of the end cutting edge rake face 19 with respect to the axial line O.

Specifically, the axial rake ($\theta$A) formed by the end cutting edge rake face 19 ranges from +1° to +5°.

<End Rake>

As shown on an enlarged scale in FIG. 5, in the present first embodiment, an end rake ($\theta$E) formed by the end cutting edge 21 is negative (−); specifically, −5° to −10°. FIG. 5 shows positive (+) and negative (−) of the end rake ($\theta$E).

When viewed from the distal-end side along the axial line O, the end rake ($\theta$E) is an angle ($\theta$E) between the end cutting edge 21 and a straight line (LE) extending from the center axis ($\theta$C) to a peripheral end 21a of the end cutting edge 21.

1-3. Effects

Next, effects of the present first embodiment will be described.

(1) In the present first embodiment, the corner R rake face 27 does not exist in the region A on the side toward the end cutting edge 21, but exists in the region B on the side toward the peripheral cutting edge 13 and contains the point B. In other words, the cutting edge 28 on a peripheral edge portion of the corner R rake face 27 is a portion of the corner R cutting edge 23 and is formed on the peripheral edge of the region B, not the region A, and the cutting edge 28 reaches the point B. Therefore, the corner R cutting edge 23 is unlikely to be chipped in the course of cutting.

That is, the corner R rake face 27 is such that the first end portion 27a of the cutting edge 28 on its peripheral end is located in the region B located away from the point A, which is the intersection of the end cutting edge 21 and the corner R cutting edge 23, and such that the second end portion 27b coincides with the point B. Therefore, since in the course of cutting, a large cutting load is unlikely to be imposed on the first end portion 27a of the corner R rake face 27, the corner R cutting edge 23 is unlikely to be chipped.

(2) In the present first embodiment, since the axial rake ($\theta$A) formed by the end cutting edge rake face 19 is positive (specifically, +1° to +5°), the occurrence of adhesion of workpiece material can be restrained; as a result, the occurrence of partial breakage of the cutting edges such as the end cutting edge 21 and the corner R cutting edge 23 can be restrained. Also, through employment of a positive axial rake ($\theta$A) formed by the end cutting edge rake face 19, chip ejectability is improved; a bite of a chip can be restrained; and the occurrence of partial breakage of the cutting edges such as the end cutting edge and the corner R cutting edge can be restrained.

(3) Further, in the case of the radius end mill 1 made of ceramic, through employment of a positive axial rake ($\theta$A) formed by the end cutting edge rake face 19, the occurrence of adhesion of workpiece material can be restrained, but the tips of the cutting edges tend to be chipped as compared with the case of, for example, a radius end mill made of cemented carbide. By contrast, in the case of the present first embodiment, since the end rake ($\theta$E) formed by the end cutting edge 21 is negative; specifically, −5° to −10°, the occurrence of partial breakage of the tips of the cutting edges can be restrained.

That is, the radius end mill 1 yields marked effects of restraining the occurrence of adhesion of workpiece material and comprehensively restraining the occurrence of partial breakage of the cutting edges.

(4) Further, since the radius end mill 1 of the present first embodiment is a unitary ceramic part, as compared with a radius end mill having the shank 5 made of metal, the radius end mill 1 has the advantage of very light weight.

1-4. Experimental Examples

Next, experimental examples will be described.

In experimental example 1, there were prepared samples of the radius end mill of the above-mentioned first embodiment in which their axial rakes were positive (e.g., +3° within the range of +1° to +5°) and their end rakes were set to −5° and −10°, respectively.

By use of the samples, workpieces (ALLOY718) were cut under the following conditions: cutting speed 600 m/min; feed 0.03 mm/t; and cut ap (depth)=0.5 mm, ae (width)=5 mm. As a result, the samples were free from adhesion of workpiece material and partial breakage of cutting edges at a cutting distance of 49 m or less.

In the case of a comparative example having a negative axial rake (e.g., −1°) (other configurational features were the same as those of the samples), partial breakage of a cutting edge occurred before the above-mentioned cutting distance was reached.

In experimental example 2, there were prepared samples of the radius end mill of the above-mentioned first embodiment in which their end rakes were, for example, −7° within the range of −5° to −10° and their axial rakes were set to +1° and +5°, respectively.

Workpieces (ALLOY718) were cut under the following conditions: cutting speed 600 m/min; feed 0.03 mm/t; and cut ap=0.5 mm, ae=5 mm. As a result, the samples were free from adhesion of workpiece material and partial breakage of cutting edges at a cutting distance of 49 m or less.

Further, in experimental example 3, there were prepared samples of the radius end mill of the above-mentioned first embodiment in which their axial rakes were positive and fell outside the range of +1° to +5° (e.g., +0.5°) (other configurational features were the same as those of experimental example 1) and performed cutting under conditions similar to those of experimental example 1.

In this case, although the degree of effect was less than in the case of the above-mentioned experimental example 1, the samples were free from partial breakage of cutting edges at a cutting distance of 42 m or less. That is, when the samples of experimental example 1 and the samples of experimental example 3 were subjected to cutting until chipping occurred under the conditions of experimental example 1, the samples of experimental example 1 were longer in cutting distance than the samples of experimental example 3. An example of the upper limit of a positive axial rake is +6°.

1-5. Terminological Correspondence

The terminological correspondence between the present first embodiment and the present disclosure will be described.

The radius end mill 1, the end mill body 3, the chip ejection groove 9, the peripheral cutting edge 13, the gash 17, the end cutting edge rake face 19, the end cutting edge 21, the corner R cutting edge 23, and the corner R rake face 27 of the present first embodiment correspond respectively to examples of the radius end mill, the end mill body, the chip ejection groove, the peripheral cutting edge, the gash, the end cutting edge rake face, the end cutting edge, the corner R cutting edge, and the corner R rake face of the present disclosure.

2. Second Embodiment

Next, the second embodiment will be described; however, contents which are the same as those of the first embodiment will not be described or will be described briefly. Configurational features which are the same as those of the first embodiment will be described by use of the same reference numerals as those of the first embodiment.

Figure 6:
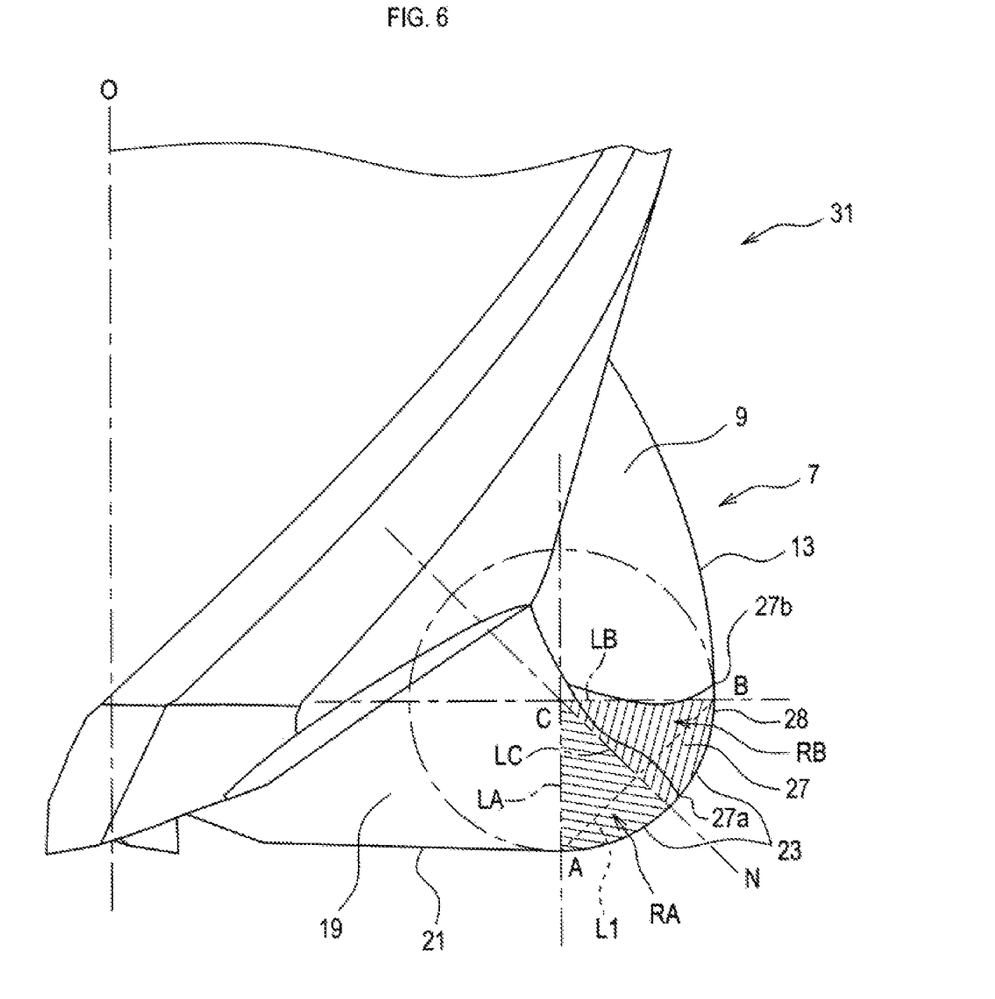
FIG. 6 Side view showing, on an enlarged scale, a portion of the distal-end side of a radius end mill of a second embodiment.

As shown in FIG. 6, a radius end mill 31 of the second embodiment has a configuration approximately the same as that of the cutting edge portion 7 of the first embodiment.

Specifically, similar to the aforementioned first embodiment, with a point A representing an intersection of the corner R cutting edge 23 and the end cutting edge 21 and with a point B representing an intersection of the corner R cutting edge 23 and the peripheral cutting edge 13, as viewed from a direction perpendicular to a plane which contains the axial line O and passes through the point B, a point C represents an intersection of a straight line A (LA) in parallel with the axial line O and passing through the point A and a straight line B (LB) perpendicular to the axial line O and passing through the point B. Further, when a region surrounded by the straight line A, the straight line B, and the corner R cutting edge 23 is divided by a straight line C (LC) passing through the point C and through a midpoint of a straight line (L1) extending from the point A to the point B, a region A (RA) represents a region located on a side toward the point A with respect to the dividing straight line C, and a region B (RB) represents a region located on a side toward the point B with respect to the dividing straight line C.

In this case, the corner R rake face 27 does not exist in the region A, contains the point B, and is formed in at least region B. Moreover, the second end portion 27b of the cutting edge 28 on the peripheral end of the corner R rake face 27 is not located at the point B, and the cutting edge 28 extends beyond the point B toward the peripheral-cutting-edge-13 side.

Notably, that portion of the cutting edge 28 on the peripheral end of the corner R rake face 27, which portion is located in the region B can be said to be a portion of the corner R cutting edge 23, and that portion of the cutting edge 28 which extends beyond the point B and reaches the second end portion 27b can be said to be a portion of the peripheral cutting edge 13.

Particularly, the radius end mill 31 of the present second embodiment has the corner R rake face 27 different in shape from that of the first embodiment, between the end cutting edge rake face 19 and the chip ejection groove 9.

That is, the peripheral cutting edge 28 of the corner R rake face 27 is formed in such a manner as to pass through the point B and reach a portion of the peripheral cutting edge 13 (extend upward in FIG. 6).

Even the present second embodiment yields effects which are the same as those to be yielded by the aforementioned first embodiment.

3. Third Embodiment

Next, the third embodiment will be described; however, contents which are the same as those of the first embodiment will not be described or will be described briefly. Configurational features which are the same as those of the first embodiment will be described by use of the same reference numerals as those of the first embodiment.

Figure 7:
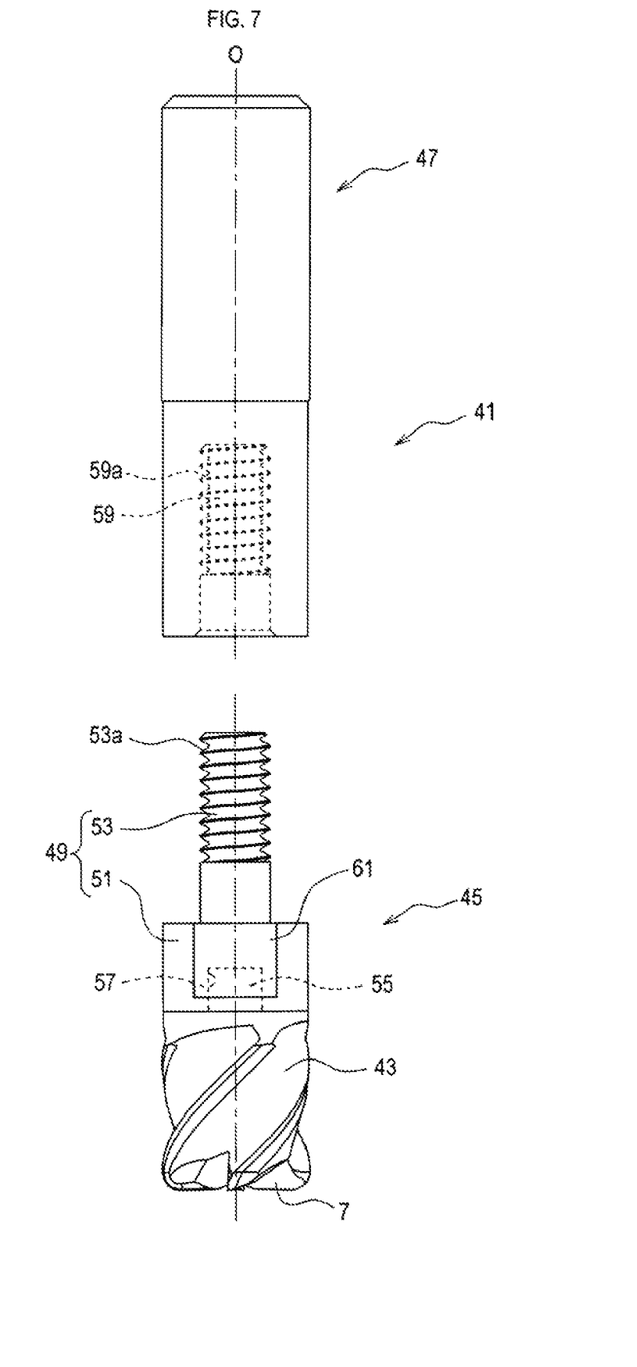
FIG. 7 Exploded front view showing a radius end mill of a third embodiment.
Figure 8:
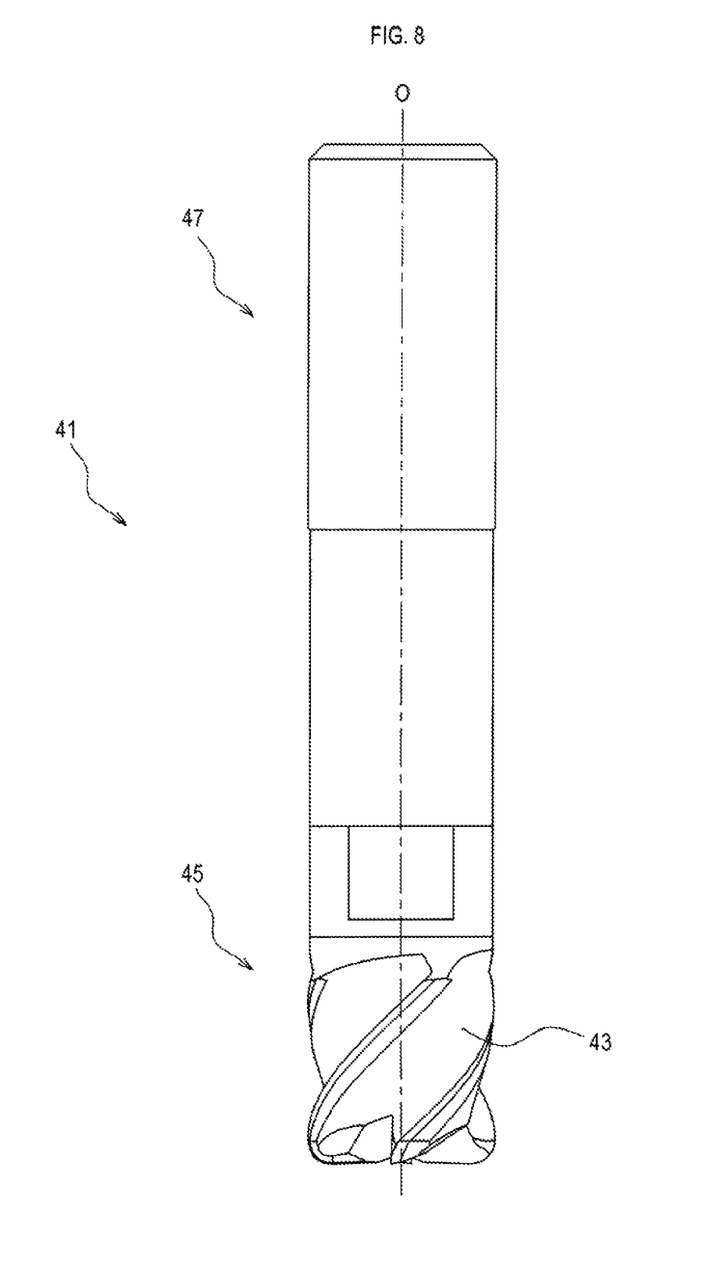
FIG. 8 Front view showing a state in which an interchangeable head member and a shank of the radius end mill of the third embodiment are connected together.
Figure 9:
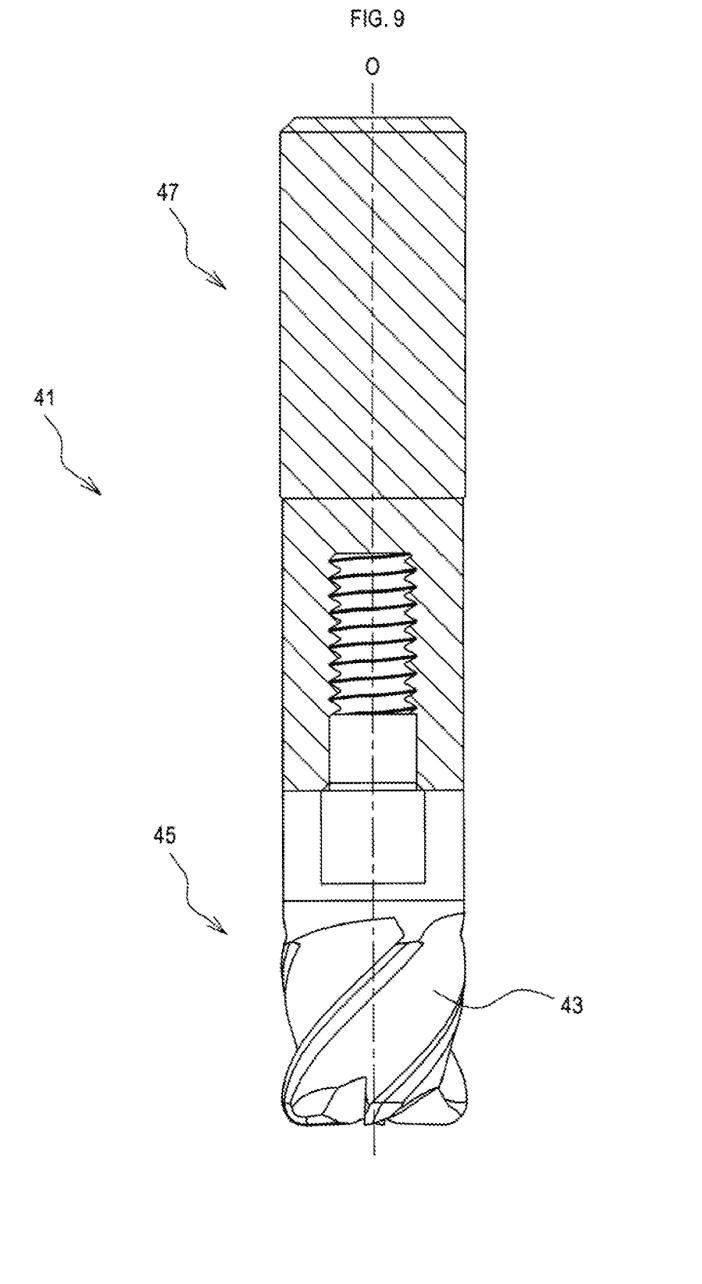
FIG. 9 Front view showing a state in which the interchangeable head member and the shank of the radius end mill of the third embodiment are connected together, with the shank shown in an axially cutaway manner.

As shown in FIGS. 7, 8, and 9, a radius end mill 41 of the present third embodiment is a head-interchangeable cutting tool in which an interchangeable head member 45 having an end mill body 43, and a shank 47 are detachably connected together.

Specifically, similar to the first embodiment, the end mill body 43 is made of ceramic such as silicon nitride or the like and has the cutting edge portion 7 located on the distal-end side (the lower side in FIG. 7) thereof. A body-side connection portion 49 formed by use of, for example, steel (e.g., an alloyed steel) is integrally fixed to the rear end of the end mill body 43.

The body-side connection portion 49 has an approximately disk-shaped base 51 and a connecting protrusion 53 protruding rearward along the axial line O from the rear-end side of the base 51. The connecting protrusion 53 has an external thread 53a formed on its outer circumferential surface on the distal side.

The end mill body 43 has a polygonal columnar (e.g., square columnar) protrusion 55 protruding rearward along the axial line O from the rear end side thereof. The base 51 has an engagement recess 57 formed on the distal-end side thereof. The engagement recess 57 is a polygonal columnar (e.g., square columnar) space for receiving the protrusion 55.

The protrusion 55 of the end mill body 43 is fitted into the engagement recess 57 of the base 51 and joined by using a brazing material, whereby the end mill body 43 and the base 51 (thus, the body-side connection portion 49) are fixed together in a body.

The united body of the end mill body 43 and the body-side connection portion 49 is called the interchangeable head member 45.

Meanwhile, the shank 47 is a rodlike member formed by use of, for example, steel and has a shank-side connection portion 59 formed on its distal end side. The shank-side connection portion 59 is a recessed portion into which the connecting protrusion 53 is screwed. The shank-side connection portion 59 has an internal thread 59a formed on its inner circumferential surface so as to be threadingly engaged with the external thread 53a of the connecting protrusion 53.

The body-side connection portion 49 has two engagement planes 61 formed in parallel with each other on the outer circumferential surface of the base 51 thereof.

Therefore, in unitarily connecting the end mill body 43 (thus, the interchangeable head member 45) and the shank 47, the connecting protrusion 53 of the body-side connection portion 49 may be screwed into the shank-side connection portion 59. In screwing the body-side connection portion 49, a tool such as a wrench is engaged with the two engagement planes 61 of the base 51 for gripping it, and the tool is turned in a screwing direction, whereby the interchangeable head member 45 can be firmly fixed to the shank 47.

The present third embodiment yields effects which are the same as those to be yielded by the aforementioned first embodiment.

In the event of wear or breakage of the distal-end side of the end mill body 43 stemming from cutting with the radius end mill 41, only the interchangeable head member 45 can be detached from the shank 47 and replaced.

The structure in which the interchangeable head member 45 and the shank 47 are detachably connected as in the case of the present third embodiment can be applied to the second embodiment.

4. Other Embodiments

The present disclosure is not limited to the above embodiments, but may be embodied in various other forms without departing from the scope of the disclosure.

(1) For example, the range of formation of the corner R rake face is not limited to that of the above embodiments, but may be determined freely without departing from the scope of the present disclosure.

(2) Examples of ceramic used to form the end mill body and the radius end mill include silicon nitride, sialon, alumina, and zirconia.

(3) The function of a single constituent element in the above embodiments may be allotted to a plurality of constituent elements, and the functions of a plurality of constituent elements may be realized by a single constituent element. The configurations of the above embodiments may be partially eliminated. At least a portion of the configuration of one of the above embodiments may be added to the configuration of the other embodiment or replaced with at least a portion of the configuration of the other embodiment. All modes contained in technical ideas to be specified from wording in the appended claims are embodiments of the present disclosure.

What is claimed is:

1. An end mill body made of ceramic and constituting being a distal-end side of a radius end mill to be rotated about an axial line, having
    a chip ejection groove formed in a periphery of a distal end portion of the end mill body as to extend from a distal-end side toward a rear-end side while twisting in a direction opposite a direction of rotation,
    a peripheral cutting edge formed on a peripheral-side ridge of the chip ejection groove,
    a gash extending from a distal end portion of the end mill body to the chip ejection groove,
    an end cutting edge rake face formed on the gash,
    an end cutting edge formed on the distal end portion of the end mill body, a corner R cutting edge arcuately extending from the end cutting edge to the peripheral cutting edge as to be outwardly convex, and a corner R rake face provided between the end cutting edge rake face and the chip ejection groove as to adjoin the corner R cutting edge, with a point A representing an intersection of the corner R cutting edge and the end cutting edge and with a point B representing an intersection of the corner R cutting edge and the peripheral cutting edge, as viewed from a direction perpendicular to a plane which contains the axial line and passes through the point B, wherein a point C represents an intersection of a straight line A in parallel with the axial line and passing through the point A and a straight line B perpendicular to the axial line and passing through the point B and that when a region surrounded by the straight line A, the straight line B, and the corner R cutting edge is divided by a straight line C passing through the point C and through a midpoint of a straight line extending from the point A to the point B, a region A represents a region located on a side toward the point A with respect to the dividing straight line C, and a region B represents a region located on a side toward the point B with respect to the dividing straight line C, the corner R rake face not existing in the region A, and being formed as to contain the point B and to exist in at least the region B.

2. The end mill body according to claim 1, wherein
an end rake formed by the end cutting edge is −5° to −10° and
an axial rake formed by the end cutting edge rake face is positive.

3. The end mill body according to claim 2, wherein the axial rake formed by the end cutting edge rake face is +1° to +5°.

4. The end mill body according to claim 1, comprising a body-side connection portion provided on a rear-end side thereof as to be detachably connected to a shank to be fixed to a rotating shaft of a machine tool.

5. A radius end mill comprising
an end mill body provided on a distal-end side thereof for cutting a workpiece, and a shank provided on a rear-end side thereof and to be fixed to a rotating shaft of a machine tool,
the end mill body being an end mill body according to claim 1.

6. The radius end mill according to claim 5, wherein
the radius end mill is made of ceramic, and
the end mill body and the shank are integrated with each other.

7. The radius end mill according to claim 5, wherein
the radius end mill is configured such that the end mill body and the shank are detachably connected to each other, and
the end mill body comprises a body-side connection portion provided on a rear-end side thereof as to be detachably connected to the shank.

* * * * *

UNITED STATES PATENT AND TRADEMARK OFFICE
CERTIFICATE OF CORRECTION

PATENT NO. : 11,000,906 B2
APPLICATION NO. : 16/312447
DATED : May 11, 2021
INVENTOR(S) : Shusuke Kitagawa and Yuki Hatano Page 1 of 1

It is certified that error appears in the above-identified patent and that said Letters Patent is hereby corrected as shown below:

In the Claims

Claim 1, Column 12, Line 54, remove "constituting"

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*